(12) United States Patent
Tait (10) Patent No.: US 7,885,821 B2
(45) Date of Patent: Feb. 8, 2011

(54) PACKAGE PICKUP INDICATOR SYSTEM

(76) Inventor: Michael Tait, 140 E. Woods Dr., Lititz, PA (US) 17543

( * ) Notice: Subject to any disclaimer, the term of this patent is extended or adjusted under 35 U.S.C. 154(b) by 442 days.

(21) Appl. No.: 11/396,735

(22) Filed: Apr. 3, 2006

(65) Prior Publication Data

US 2007/0233504 A1 Oct. 4, 2007

(51) Int. Cl.
G06Q 10/00 (2006.01)
G06Q 30/00 (2006.01)

(52) U.S. Cl. .................... 705/1.1; 705/330; 705/333

(58) Field of Classification Search ............... None
See application file for complete search history.

(56) References Cited

U.S. PATENT DOCUMENTS

| | | | |
|---|---|---|---|
| 2,468,257 A | 4/1949 | Fagner | |
| 3,143,286 A | 8/1964 | Edge, Sr. | |
| 3,144,986 A | 8/1964 | Hendrickson | |
| 3,586,235 A | 6/1971 | Fishel | |
| 5,774,053 A | 6/1998 | Porter | |
| 6,003,286 A | 12/1999 | Goodman, Jr. | |
| 6,094,642 A * | 7/2000 | Stephenson et al. | 705/28 |
| 6,119,622 A | 9/2000 | Banerjea | |
| 6,344,796 B1 | 2/2002 | Ogilvie et al. | |
| 6,429,810 B1 * | 8/2002 | De Roche | 342/357.07 |
| 6,690,997 B2 | 2/2004 | Rivalto | |
| 6,866,195 B2 | 3/2005 | Knowles et al. | |
| 6,889,194 B1 | 5/2005 | Kadaba | |
| 7,624,024 B2 * | 11/2009 | Levis et al. | 705/1.1 |
| 2001/0040422 A1 * | 11/2001 | Gramlich | 312/234 |
| 2002/0016726 A1 | 2/2002 | Ross | |
| 2002/0087375 A1 | 7/2002 | Griffin et al. | |
| 2002/0162883 A1 * | 11/2002 | Arvonio et al. | 232/45 |
| 2004/0267640 A1 | 12/2004 | Bong et al. | |
| 2005/0154602 A1 | 7/2005 | Hertz | |
| 2005/0171738 A1 * | 8/2005 | Kadaba | 702/187 |
| 2005/0251402 A1 | 11/2005 | Olsen, III et al. | |

FOREIGN PATENT DOCUMENTS

WO    WO 97/25694    7/1997

* cited by examiner

*Primary Examiner*—John W Hayes
*Assistant Examiner*—George Chen
(74) *Attorney, Agent, or Firm*—McNees Wallace & Nurick LLC (57) ABSTRACT

A package pickup indicator system is disclosed. The system includes a monitoring system and an indicator capable of being detected by a route driver for a shipping carrier in a shipping carrier vehicle. The monitoring system is in communication with at least one shipping carrier customer package tracking system and is in communication with the indicator. The monitoring system is configured to activate the indicator when a package at a place of business is ready to be picked up for shipment by the shipping carrier and is further configured to query the shipping carrier customer package tracking system about a status of the package to be shipped. The monitoring system automatically deactivates the indicator upon a response from the shipping carrier customer package system that the package to be shipped is in possession of the shipping carrier.

17 Claims, 6 Drawing Sheets

PACKAGE PICKUP INDICATOR SYSTEM

FIELD OF THE INVENTION

The present invention is directed to a system that automatically activates an indicator detectable by a shipping carrier's route driver when a given customer has a package that needs to be picked up for shipment by the shipping carrier and that automatically deactivates the indicator after the package has been picked up by the route driver.

BACKGROUND OF THE INVENTION

Small companies that have seasonal or cyclical business often suffer inefficient operation because shipping carriers do not regularly include those types of businesses on their delivery/pickup routes. These seasonal or cyclical businesses typically have times of the year where some or many packages need to be shipped every day, while at other times of the year, a week may go by when only a few packages, if any, need to be shipped.

As a result, a problem exists in that shipping carriers often find it prohibitively expensive to include all of these businesses on their delivery/pickup routes because the carriers' route drivers spend unnecessary time entering places of business to learn whether or not a package needs to be picked up. As a result, businesses that have seasonal or cyclical business are often excluded from the regular delivery routes even during the busy seasons, causing lost time and inefficiencies by the businesses in scheduling or arranging package pickups.

A problem also exists that even when a business is included on a regular delivery route, but does not have package pickups on a regular basis, the shipping carrier still experiences lost time and inefficiencies if the carriers' route driver must spend unnecessary time entering places of business to learn whether or not a package needs to be picked up.

What is needed is a system that alerts a shipping carrier's route driver to packages that must be picked up without the route driver expending resources in entering the place of business to determine whether a package needs to be shipped. What is also needed is a system that alerts route drivers assigned by the carrier to a regular delivery/pickup route that a place of business not on the regular route has a package that must be picked up, without the driver expending resources in leaving the regular route, traveling to the place of business, and then entering the place of business to determine whether a package needs to be shipped.

SUMMARY OF THE INVENTION

According to an embodiment of the invention, a package pickup indicator system is provided. The package pickup indicator system comprises a monitoring system and an indicator capable of being detected by a route driver for a shipping carrier in a shipping carrier vehicle. The monitoring system is in communication with at least one shipping carrier customer package tracking system and is in communication with the indicator, wherein the monitoring system is configured to activate the indicator when a package at a place of business is ready to be picked up for shipment by the shipping carrier and wherein the monitoring system is further configured to query the shipping carrier customer package tracking system about a status of the package to be shipped. The monitoring system automatically deactivates the indicator upon a response from the shipping carrier customer package system that the package to be shipped is in possession of the shipping carrier.

According to another embodiment of the invention, a method for providing information to a shipping carrier is provided. The method comprises the steps of preparing a shipping request for a package to be shipped with a shipping carrier, identifying a tracking number associated with the package, activating an indicator capable of being detected by a route driver of the shipping carrier in a shipping carrier vehicle, querying a shipping carrier customer package tracking system to determine a status of the package, and in response to determining a status of the package corresponding to the package being the possession of the shipping carrier, automatically deactivating the indicator.

One advantage of the invention is that a shipping carrier's route driver can determine if a package needs picked up at a place of business without expending resources in entering the place of business to make that determination.

Another advantage of the invention is that a shipping carrier's route driver assigned to a regular carrier route can learn whether a package needs to be picked up from a business along or in the vicinity of the regular carrier route.

Yet another advantage of the invention is that businesses not receiving regularly scheduled pick-ups suffer fewer inefficiencies by being excluded from the scheduled route, in that if the business has a package to be picked up, an indicator is automatically activated to convey the information regarding the need for pickup to the shipping carrier's route driver, who can leave the scheduled route to pick up the package and then return to the route.

Other features and advantages of the present invention will be apparent from the following more detailed description of the preferred embodiment, taken in conjunction with the accompanying drawings which illustrate, by way of example, the principles of the invention.

DESCRIPTION OF THE DRAWINGS

Where like parts are found in more than one drawing, like numerals are used for clarity.

DETAILED DESCRIPTION OF THE INVENTION

Shipping carriers typically include the ability to track packages shipped with that carrier using a tracking number or other indicator as a part of their services. This in turn gives customers the ability to learn a greater amount of information on how and when a package is being delivered. Exemplary embodiments of the present invention advantageously make use of this information by automatically querying the carrier's customer tracking number system and activating or deactivating an indicator in response to that information.

The package pickup indicator system is an automated system that includes an indicator and a monitoring system. The indicator is automatically activated when a package to be shipped with the shipping carrier needs to be picked up. The indicator can be seen or otherwise detected by a shipping carrier's route driver. The indicator may be a light, a sign or any other device that can be viewed or detected from a distance. In a preferred embodiment, the indicator is a light that can be viewed by the shipping carrier's route driver from a road on which the carrier driver has a regular route. By "regular route" is meant any route scheduled by the shipping carrier to which a shipping carrier driver is assigned to travel for pickup of packages to be shipped by the shipping carrier.

The indicator is automatically activated by the monitoring system when a person completes a shipping bill for pickup of a package and the package is assigned a customer tracking number. In a preferred embodiment, the monitoring system determines whether any packages are needed to be shipped with a particular shipping carrier using that shipping carrier's customer order tracking system. Once the monitoring system determines that a package is ready for pickup (e.g., a shipping bill is filled out), the indicator is activated.

The monitoring system continues to monitor the shipping carrier's customer order tracking system; after the monitoring system determines that the carrier's route driver has picked up the package, the indicator is deactivated.

Figure 1:
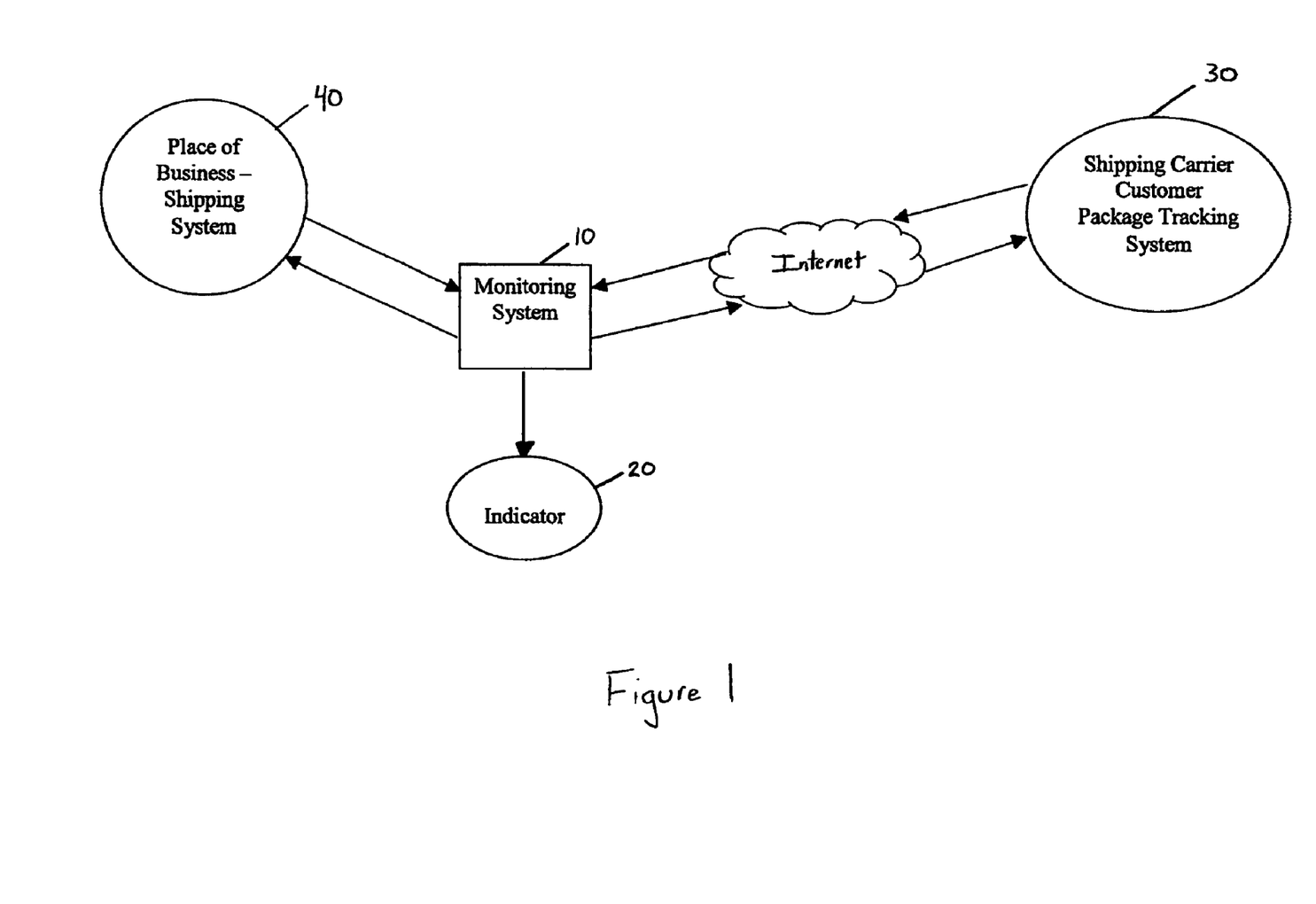
FIG. 1 is a flowchart depicting a package pickup indicator system according to an exemplary embodiment of the invention.

Referring now to FIG. 1, a package pickup indicator system in accordance with an exemplary embodiment of the invention is shown in flowchart form. A monitoring system 10 is in two-way communication with a shipping system 40 at a place of business having items to be shipped and the monitoring system 10 is in two-way communication with a shipping carrier's customer package tracking system 30. The monitoring system 10 is further in one way communication with an indicator 20. The indicator 20 is preferably a visual indicator, such as a light. The light may be any kind of light and may be lit at a constant brightness or may flash, for example, in a timed sequence.

The place of business shipping system 40 is a computer or a local network of computers at the place of business, which computer includes software for creating a shipping request. By "shipping request" is meant a packing slip, packing label, shipping bill, or any other document, paper or electronic, that involves the generation or activation of a package tracking number associated with a package to be shipped. The software on the place of business shipping system 40 for creating the shipping request may be software that facilitates the use of additional software remote from the shipping system to generate the shipping request or the software may be specific to performing the function of creating a shipping request. For example, many shipping carriers provide Internet sites that facilitate the creation of packing slips or other shipping requests, including the generation of tracking numbers, and may only require local software in the form of a web browser on a user computer to access the carrier's website. Other shipping carriers or third party vendors may provide software that is entirely local to the place of business shipping system 40, and may even pre-provide tracking numbers that are already assigned to a blank shipping bill that only need to be activated in the shipping carrier's tracking system.

The shipping carrier customer package tracking system 30 may be any computer or network of computers on which a shipping carrier logs the progress of packages it ships that is accessible by customers or other individuals with knowledge of the tracking number to ascertain information on the progress of those packages toward delivery. The shipping carrier customer package tracking system 30 is typically accessible to customers via the Internet. These systems are well known in the art for use by customers of shipping carriers.

The monitoring system 10 includes software for communicating with the place of business shipping system 40 and with the shipping carrier customer package tracking system 30, including software for providing the tracking number of a package to the tracking system 30 to query the status of the associated package. The software may be loaded onto the same computer as the shipping request software, such that the monitoring system 10 and the place of business shipping system 40 advantageously comprise the same computer. Alternatively, the monitoring system software may be loaded onto a separate computer, such as a server in communication with the computer(s) of the place of business shipping system 40.

When a shipping request is prepared, the monitoring system 10 identifies a tracking number associated with that shipping request, and thus associated with the package to be shipped. The identification by the monitoring system 10 of the tracking number may occur in any suitable manner and typically involves receiving the tracking number from the place of business shipping system 40. For example, as mentioned, when the shipping request is generated through the shipping carrier's website by a user of the place of business shipping system 40, the shipping request typically causes a tracking number to be generated and activates that number in the shipping carrier customer package tracking system 30. In many cases, the shipping carrier's website displays a confirmation of the shipping request that includes the generation of a new URL that includes the tracking number as part of the web address. The URL for each shipping request can be saved to a memory of the place of business shipping system 40 for later access by the monitoring system 10 to search and identify tracking numbers. Another exemplary way of identifying the tracking number includes automated searching by the monitoring system 10 of confirmatory emails that a shipping request was successfully placed, which emails may be sent by the shipping carrier to the place of business shipping system 40. Still another exemplary way of identifying the tracking number includes scanning a hard copy of a shipping bill containing a tracking number using a scanner having optical character resolution capabilities, followed by automated searching of the resulting text, which text could be saved as a separate file on the place of business shipping system 40 for access by the monitoring system 10.

Regardless of the manner in which the tracking number is identified by the monitoring system 10, the monitoring system 10 queries the tracking system 30. If the tracking number is in the tracking system 30, the monitoring system 10 determines that the shipping request has been made. The monitoring system 10 then initiates a one-way communication to activate the indicator 20.

Alternatively, the monitoring system 10 may be programmed such that detection of the generation of the shipping request alone is sufficient to cause the monitoring system 10 to activate the indicator 20. In some cases, for example, the tracking number may already be provided on a pre-printed packing slip distributed by the shipping carrier, although the tracking number is not activated by the shipping carrier in the tracking system 30 until pickup.

The indicator 20 is preferably a light or other device that allows a route driver for the shipping carrier to visually determine whether a package at the business needs to be picked up, based on whether or not the indicator 20 is activated. More preferably, the indicator 20 contains one or more LEDs.

Figure 2:
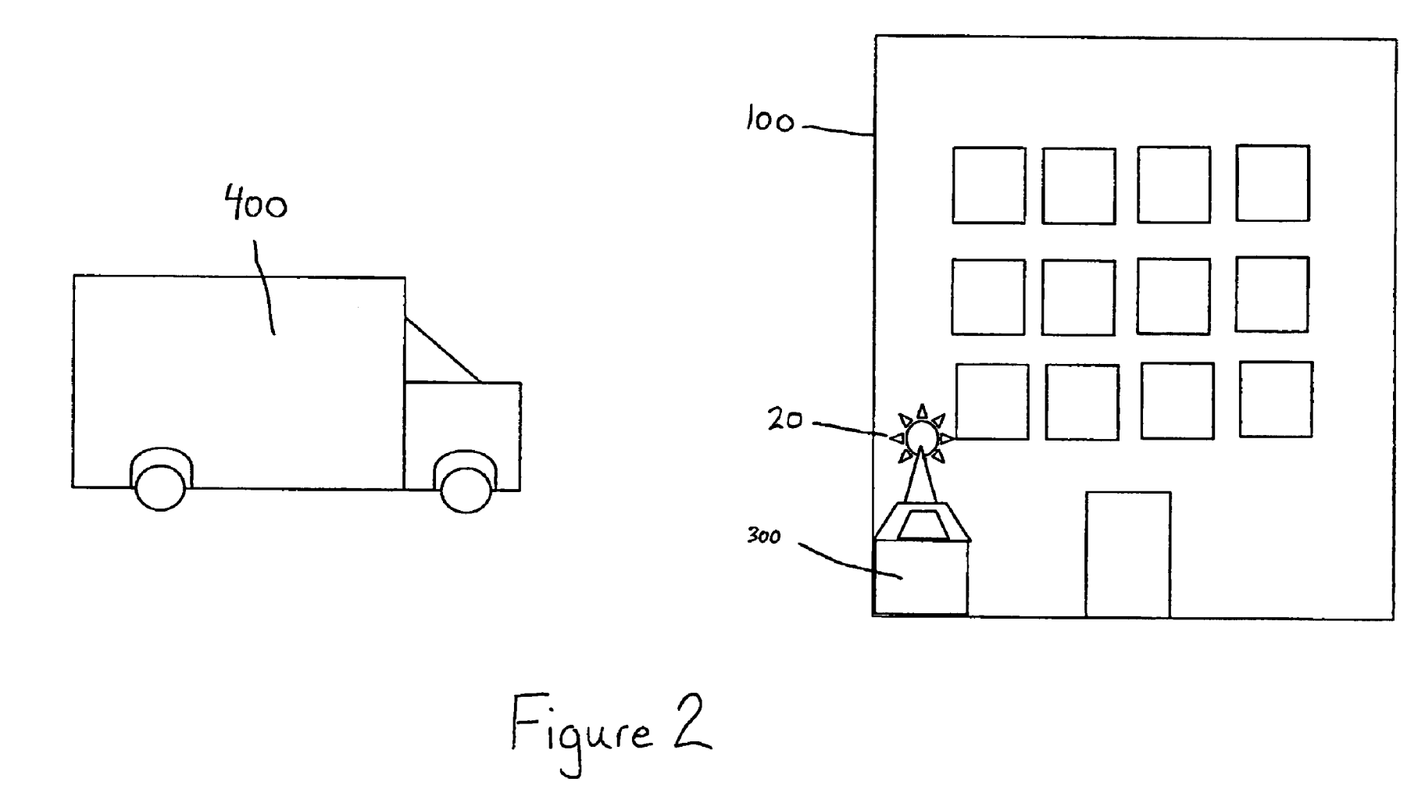
FIG. 2 is a place of business having an indicator for use with the package pickup indicator system according to an exemplary embodiment of the invention.

As shown in FIG. 2, the indicator 20 is a light at or near the exterior of a place of business 100 using a package pickup indicator system according to an exemplary embodiment of the invention. Prior to pickup, the package to be shipped is preferably kept within the place of business 100 or is deposited in a secure exterior package bin 300. The indicator light 20 remains activated while the package to be shipped waits at the place of business 100. When a shipping carrier vehicle 400 passes near the place of business 100, the route driver in the vehicle 400 can readily determine that if the indicator 20 is lit, a package needs to be picked up. If the indicator is not lit, a package does not need to be picked up and the driver can continue on the route. In this manner, the route driver avoids wasting time stopping the vehicle, exiting the vehicle and entering the place of business to inquire whether any packages need to be picked up.

Figure 3:
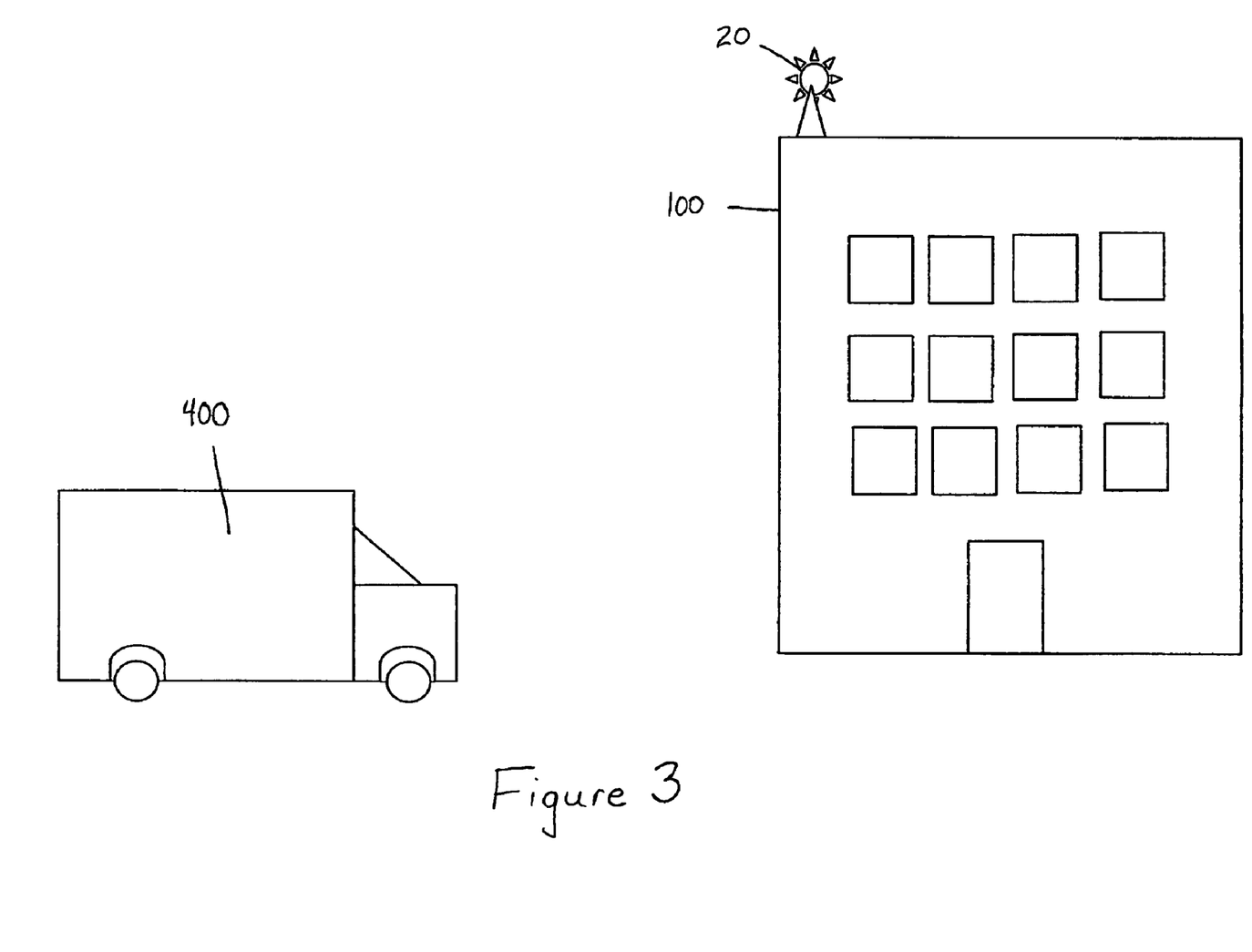
FIG. 3 is a place of business having an indicator for use with the package pickup indicator system according to another exemplary embodiment of the invention.

In some cases, the place of business 100 may not be located on the shipping carrier's regular route. Thus, even more time may be lost if the route driver first has to leave the regular route to get to the place of business 100 to learn whether any packages need to be picked up. Referring to FIG. 3, according to an exemplary embodiment of the invention, the indicator 20 can be placed at a location that increases its visibility so that the indicator 20 used by a place of business 100 not on the carrier's regular route can still be easily seen by the route driver while on that regular route. As shown in FIG. 3, the indicator 20 is located on top of the roof of the place of business 100, although it may effectively be positioned on any elevated structure that enhances its visibility. In this manner, the route driver can identify, while still in the shipping vehicle 400 and while still on the regular route, whether or not the place of business 100 not on the regular route has a package that needs to be picked up.

After the carrier's route driver perceives the activated indicator 20 and has thus identified the need for a package to be picked up via the activated indicator 20, the route driver proceeds to the place of business 100 and picks up the package. The package is then processed and delivered by the carrier in the customary fashion. Additionally, after the package is picked up, the indicator 20 is deactivated as discussed below.

After the indicator 20 has been activated, the monitoring system 10, which remains in communication with the carrier's tracking system 30, periodically checks for updates to the status of the package using its assigned tracking number. As part of the normal pickup and delivery process employed by most shipping carriers, at pick up, the route driver logs the package as having been picked up and having entered the shipping carrier's possession. This logging procedure typically includes entering or updating the status of the package on the shipping carrier's tracking system 30 to show that the package has been picked up and that it is in transit toward delivery. After the carrier's tracking system 30 is updated to reflect that the package has been picked-up by the route driver and is in possession of the shipping carrier, the monitoring system 10 sends a signal to the indicator 20 to deactivate it.

It should be appreciated that embodiments of the present invention are not limited for use with a single shipping carrier. Businesses often use multiple shipping carriers, with different carriers selected for different business needs, such as price, speed of delivery, and other factors that may be dependent on package destination and which might justify using a particular carrier for one type of package but another carrier for a different type of package. For example, a business may use one carrier for domestic packages but a different carrier for international packages.

Figure 4:
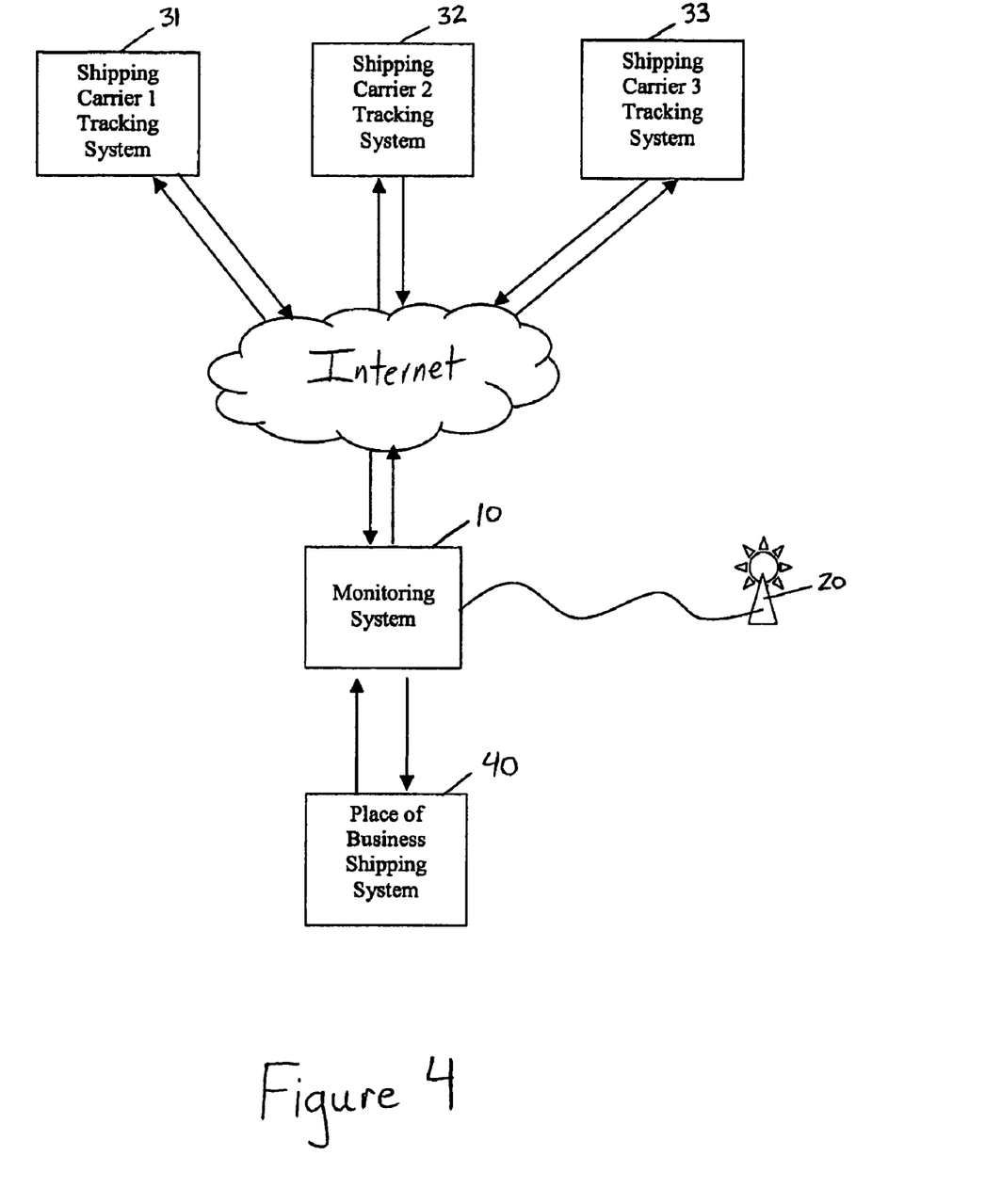
FIG. 4 is a flowchart depicting a package pickup indicator system according to an exemplary embodiment of the invention for use with multiple shipping carriers.

As shown in FIG. 4, the monitoring system 10 is in communication with multiple shipping carriers' package tracking systems 31, 32 and 33. If the monitoring system 10 is in communication with more than one shipping carrier, the indicator 20 is configured to distinguish between different carriers, such that the monitoring system 10 can separately activate the indicator 20 for each carrier. In this manner, if the indicator 20 is activated and indicates a package needs to be picked up, a route driver with a particular shipping carrier can easily distinguish whether the package is to be shipped with that driver's shipping carrier. One suitable distinguishing characteristic is providing an indicator 20 having one or more color coded lights. Advantageously, the lights may be color coded to correspond to a pre-determined identifying color associated with a particular carrier. For example, if a business uses three different carriers, the indicator 20 may be equipped with three separate lights, each of which can be separately activated by the monitoring system 10, based on whether one or more packages is ready to be picked up by a particular carrier. For example, the lights could be brown, purple, and yellow, with each color light pre-determined to be associated with each one of three different shipping carriers used by the business.

In yet another embodiment of the invention, a status of the indicator 20, i.e., whether the indicator 20 is activated, may additionally be published to various employees and/or departments at the place of business via computer, sign, light or other means to notify people within the place of business that a package is waiting to be picked up. Publishing the status of the indicator 20 to persons at the place of business provides a number of additional advantages. It allows the sender of the package to monitor whether or not the sender's package has been picked up without the sender affirmatively inquiring, such as by checking the business' loading dock or reception area or by manually accessing the shipping carrier's customer package tracking system. Internal publishing of the indicator 20 also permits persons who may be preparing additional packages for pickup to easily determine whether the shipping carrier has already visited the place of business.

Figure 5:
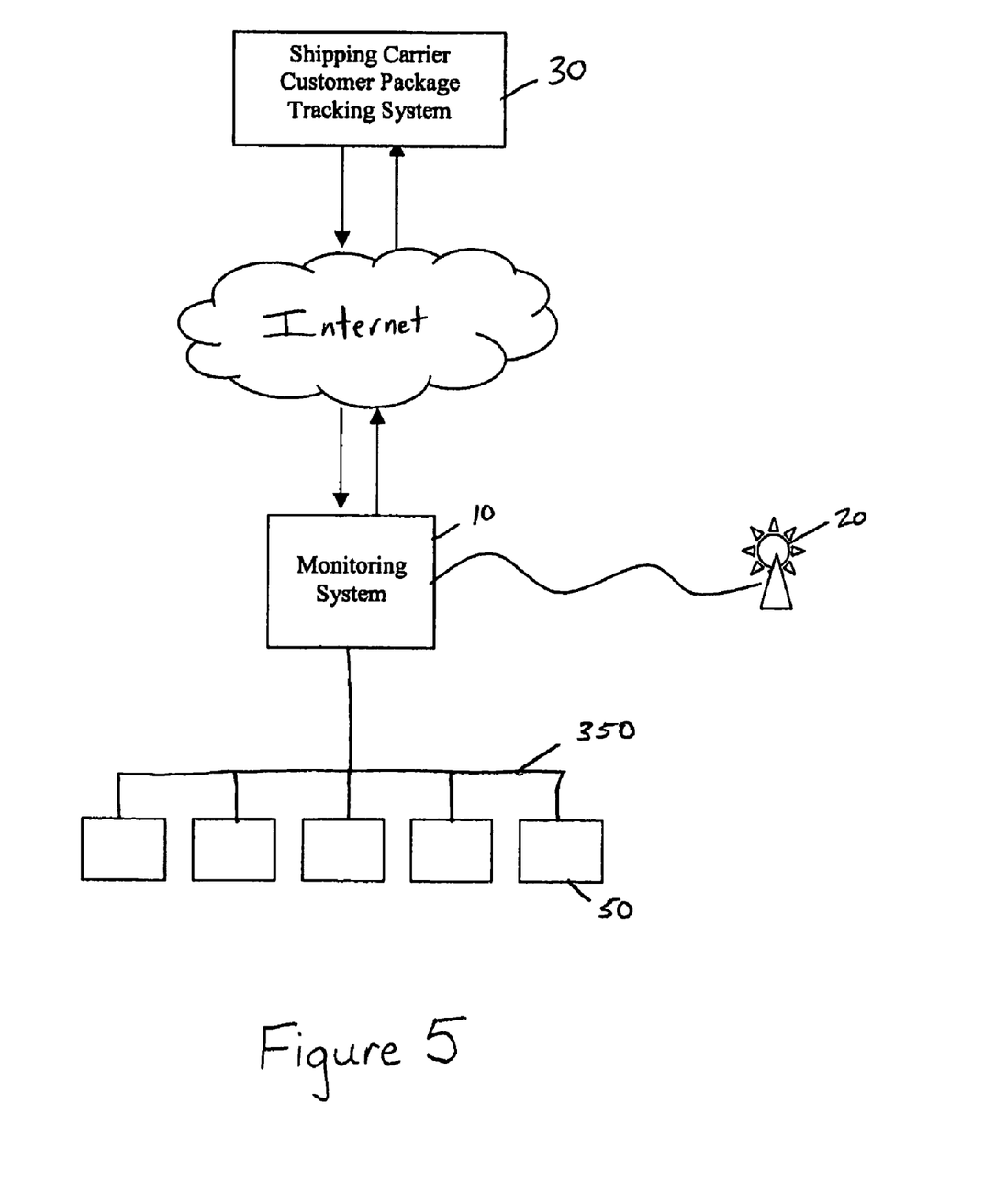
FIG. 5 is a flowchart depicting a package pickup indicator system according to an exemplary embodiment of the invention in which a plurality of user computers are connected over a local area network at the place of business.
Figure 6:
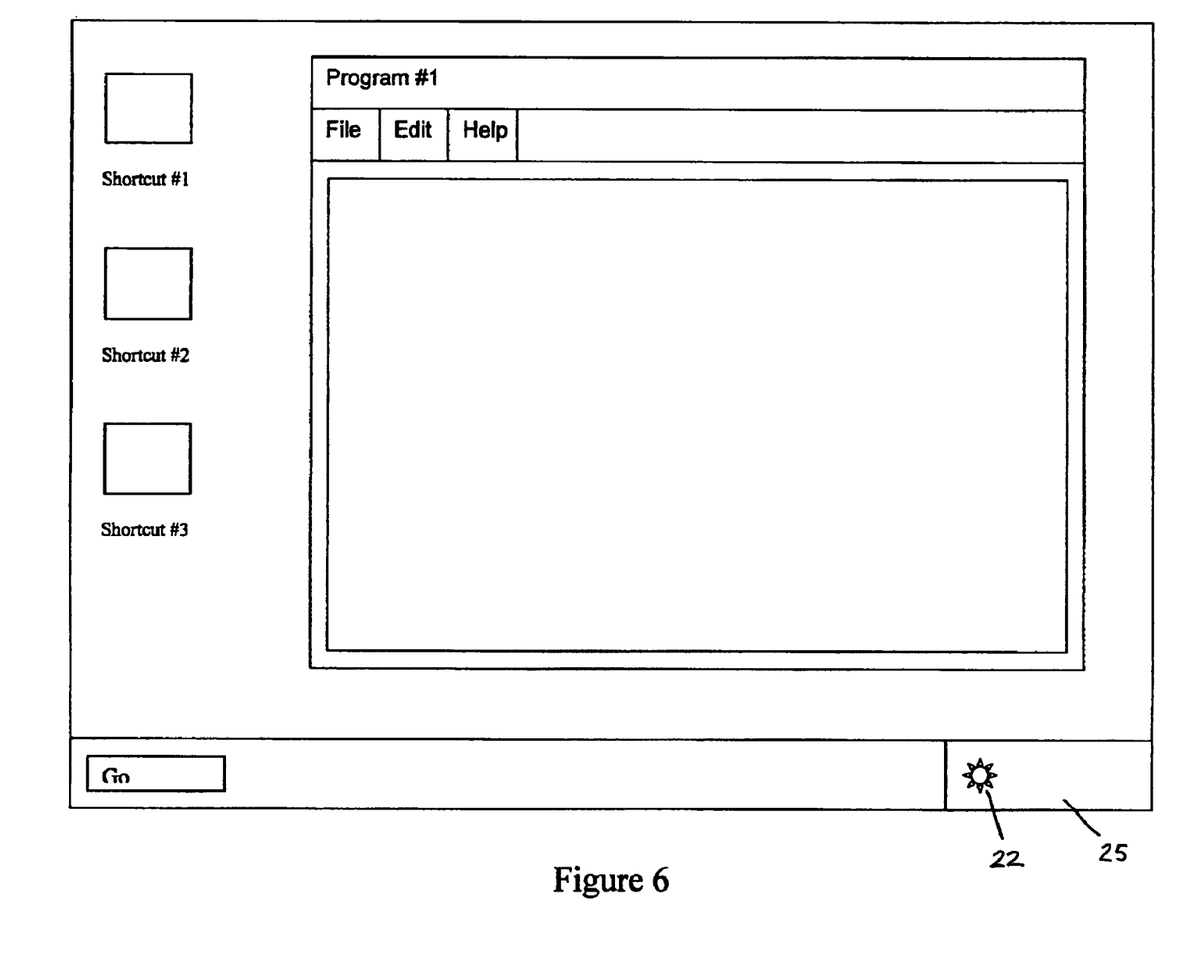
FIG. 6 is a screen shot from a user computer showing an indicator icon in accordance with an exemplary embodiment of the invention.

Preferably, the status of the indicator 20 is published to a plurality of user computers 50 over a Local Area Network (LAN) 350 that interconnects the computers 50 with the monitoring system 10 at the place of business as shown in FIG. 5. More preferably, the indicator 20 is electronically replicated for display on user computers 50 as an icon 22, such as an icon 22 appearing in a notification area 25 as shown in the exemplary screen shot of FIG. 6. Such notification areas are commonly incorporated into desktop software. The ability to display the icon 22 can be included as part of the software of the monitoring system 10. Upon activating or deactivating the indicator 20 in the manner described previously, the monitoring system 10 also sends a signal that activates or deactivates the icon 22 on each user's screen by sending a communication to the user computers 50 via the LAN 350.

The package pickup indicator system described in exemplary embodiments of the present invention addresses and solves problems faced by small or cyclical businesses as a result of their irregular package pick up needs. It should be appreciated, however, that the invention is not so limited and may advantageously be implemented for use by large commercial businesses or for personal use as well.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A package pickup indicator system comprising:
   a customer-operated monitoring system; and
   a visual indicator detected by a route driver for a shipping carrier in a shipping carrier vehicle;
   wherein the monitoring system is in communication with at least one shipping carrier customer package tracking system and is in communication with the visual indicator, wherein the monitoring system queries the shipping carrier customer package tracking system using a package-tracking number corresponding to a previously-identified package to ascertain the status of the previously-identified package, wherein the monitoring system activates the visual indicator when the status of the previously-identified package indicates that the previously-identified package is ready for pickup, wherein the monitoring system automatically deactivates the visual indicator when the status of the previously-identified package indicates that the previously-identified package is in possession of the shipping carrier;
   wherein the visual indicator is positioned on a regular route of the shipping carrier and the place of business is not on the regular route of the shipping carrier;
   wherein the visual indicator signals the route driver to avoid entering the place of business to determine whether the previously-identified package needs to be shipped; and
   wherein a status of the visual indicator is published to at least one employee at the place of business, wherein the status of the visual indicator indicates whether visual indicator is deactivated.

2. The package pickup indicator system of claim 1, wherein the monitoring system is in communication with more than one shipping carrier customer package tracking system.

3. The package pickup indicator system of claim 2, wherein the indicator comprises a plurality of independently activated and deactivated lights.

4. The package pickup indicator system of claim 3, wherein each light is a different color corresponding to a different pre-determined shipping carrier.

5. The package pickup indicator system of claim 1, wherein the monitoring system is further in communication with a place of business shipping system that comprises a device configured to generate a shipping request.

6. The package pickup indicator system of claim 5, wherein the monitoring system and the place of business shipping system are a unitary system.

7. The package pickup indicator system of claim 5, wherein the monitoring system and the place of business shipping system are in two-way communication.

8. The package pickup indicator system of claim 5, wherein the place of business shipping system is entirely local to the place of business.

9. The package pickup indicator system of claim 1, wherein the visual indicator is a light.

10. The package pickup indicator system of claim 1 further comprising a plurality of user computers in communication with the monitoring system.

11. The package pickup indicator system of claim 1, wherein the status of the indicator is published as an icon displayed on the screen of a user computer.

12. The package pickup indicator system of claim 1, wherein the place of business is a seasonal business.

13. The package pickup indicator system of claim 1, wherein the monitoring system automatically queries the shipping carrier customer package tracking system.

14. A method for providing information about a package to be picked up for shipment by a shipping carrier to a customer, the method comprising:
   querying a shipping carrier customer package tracking system using a package-tracking number corresponding to a previously-identified package to ascertain the status of the previously-identified package;
   activating a visual indicator in response to the status of the previously-identified package indicating that the previously-identified package is ready for pickup thereby signaling a route driver to avoid entering the place of business to determine whether the previously-identified package needs to be shipped;
   automatically deactivating the visual indicator in response to the status of the previously-identified package indicating that the previously-identified package is in possession of the shipping carrier; and
   wherein the visual indicator is positioned on a regular route of the shipping carrier and the place of business is not on the regular route of the shipping carrier;
   publishing a status of the visual indicator to at least one employee at the place of business, wherein the status of the visual indicator indicates whether the visual indicator is activated or deactivated.

15. The method of claim 14, wherein activating the visual indicator includes activating at least one light at a location of the previously-identified package to be shipped.

16. The method of claim 14, wherein activating the visual indicator includes activating a light associated with the shipping carrier.

17. The method of claim 14, further comprising generating a package-tracking number corresponding to the previously-identified package.

* * * * *